2 Sheets--Sheet 1.

R. ZEIDER.

Machines for Turning Axles.

No. 5,997. Reissued Aug. 4, 1874.

WITNESSES
R. Leutinger
Wm. Tinney

INVENTOR
Reuben Zeider
By Cox and Cox
His Attorneys

THE GRAPHIC CO. PHOTO-LITH. 39 & 41 PARK PLACE, N.Y.

2 Sheets--Sheet 2.
R. ZEIDER.
Machines for Turning Axles.
No. 5,997. Reissued Aug. 4, 1874.
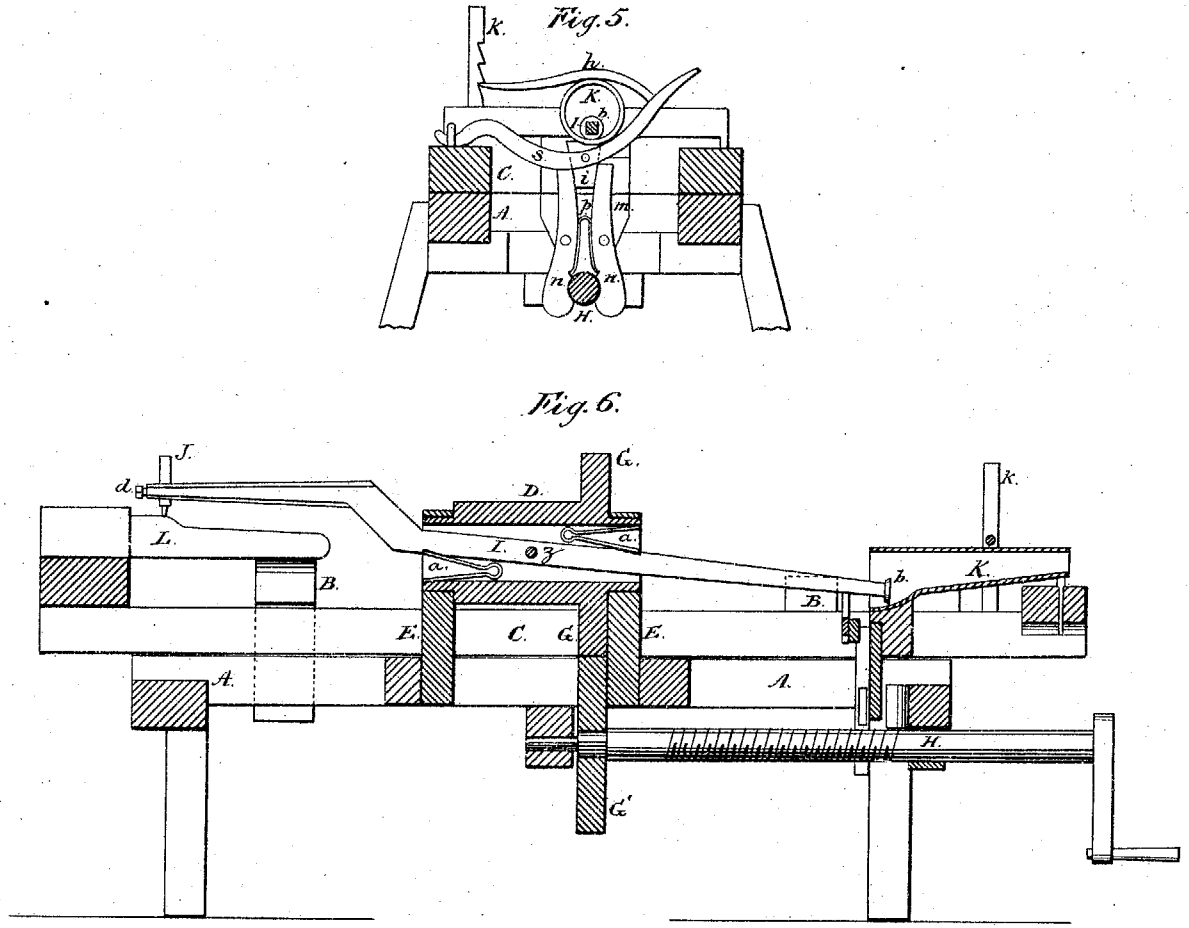
WITNESSES
R. Leuzinger
Dennis Finney
INVENTOR
Reuben Zeider
By Cox and Cox
His Attorneys
THE GRAPHIC CO. PHOTO-LITH. 39 & 41 PARK PLACE, N.Y.

UNITED STATES PATENT OFFICE.

REUBEN ZEIDER, OF WALNUT, PA., ASSIGNOR, BY MESNE ASSIGNMENTS, TO JAMES A. NIMAN, JOHN B. NIMAN, AND WILLIAM K. STEVENS.

IMPROVEMENT IN MACHINES FOR TURNING AXLES.

Specification forming part of Letters Patent No. 130,782, dated August 20, 1872; reissue No. 5,997, dated August 4, 1874; application filed June 1, 1874.

*To all whom it may concern:*

Be it known that I, REUBEN ZEIDER, formerly of El Paso, in the county of Woodford and State of Illinois, but at present of Walnut, in the county of Juniata and State of Pennsylvania, have invented certain new and useful Improvements in Machines for Turning Axles, of which the following is a specification, reference being had to the accompanying drawings.

The nature of the invention relates to the construction and arrangement of a machine for turning axles by cutting the axle automatically the exact shape of the interior of the skein or thimble, as will be hereinafter more fully set forth.

Figure 1:
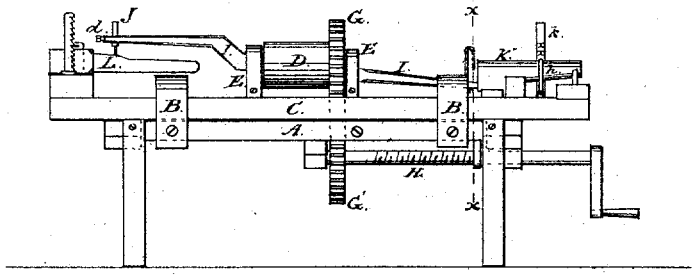
Figure 2:
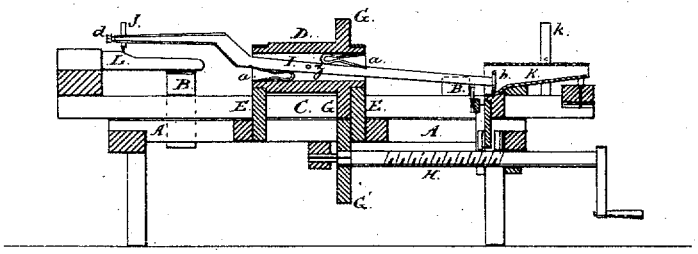
Figure 3:
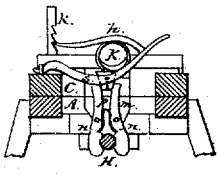
Figure 4:
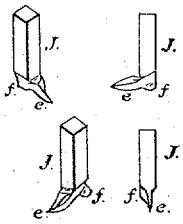

Figure 1 is a side elevation of a device embodying the element of the invention. Fig. 2 is a vertical central longitudinal section of the same. Fig. 3 is a transverse vertical section through the line *x x*, Fig. 1. Fig. 4 is a group of views of the cutter J. Fig. 5 is a vertical transverse section through the drum D. Fig. 6 is an enlarged and corrected view of Fig. 2.

In the accompanying drawings, A represents the frame of the machine, upon which, in guides B, is placed the movable frame C. In the center of the main frame A, supported by and attached to suitable cross-bars in the same, are two standards or posts, E, in which the hollow drum D has its bearings. This drum is provided with a rigidly-attached cog-wheel, G, which gears with a similar wheel, G′, upon the inner angular extremity of the screw-shaft H, having suitable bearings under the main frame A, and operated by means of a crank or other convenient power. The drum D is provided with an angular aperture of proper size to permit the cutting-bar to move in a plane at right angles to its pivot, but to prevent excessive lateral vibration. Through the hollow drum D passes the cutter-bar I, which is bent, as shown, and is pivoted so as to swing at right angles to the longitudinal axis of the drum, the pivot *z* being placed at or about the center of the drum. The cutter-bar I may be described as angular about its central portions, which pass through the drum D, whence it extends in the line of its longitudinal axis, tapering to one extremity, where is provided the friction-roller *b*, exceeding in diameter the ends of the cutter-bar, to which it is secured. The opposite part of the cutter-bar is thrown out of the line of the axis last aforesaid, but extends parallel thereto, tapering to its extremity, where it is provided with the cutter J. In the drum D are inserted the springs *a*, secured in the same by small notches in the cutter-bar on opposite sides, one spring at each end of the drum, and bearing between it and the cutter-bar, and acting in opposite directions. Upon the straight end of the cutter-bar I is a friction-roller, *b*, the diameter of which is greater than that end of the cutter-bar to which it is attached, but not so great as to prevent its operating within the thimble or skein. Through a mortise in the bent end of the cutter-bar I passes the stem or shank of a cutter or turning-tool, J, which is adjusted and held at any desired point by means of a set-screw, *d*, passing into this end of the cutter-bar. The cutter is constructed as shown in Fig. 4, being somewhat in the shape of a foot, with the cutting-edge *e* at the bottom, and at the heel it has a projecting cutting-lip, *f*. K represents the thimble, placed on one end of the movable frame C, and held firmly by a lever, *h*, one end of which is pivoted or otherwise properly secured to the said frame, and the other end secured by the ratchet-catch *k*. The end of the cutter-bar having the friction-roller *b* inserted in this thimble and the cutter J, at the other end of the bar I, works upon and around the material out of which the axle is to be turned, which is placed on the opposite end of the frame C, and held lengthwise by similar means employed for holding the thimble or skein K, as shown at L. The friction-roller *b* and adjacent end of the cutter-bar I is placed in the thimble, and the frame C drawn toward it, until the friction-wheel is flush with the rear edge of the thimble. The material to be operated upon is next placed in position, as aforesaid. The screw-shaft H is rotated and the nut clasped upon it, which gives motion to the frame C, and at the same time rotates the drum D, the sides of the aperture in which being straight and conformed to those of the cutter-bar I, the latter is rotated, the friction-roller moving over the interior surface of the thimble, thereby causing the cutter J to traverse around the material to be operated upon, which is secured as aforesaid, and said cutter being properly adjusted an axle is turned out corresponding in size and shape with the interior of the thimble; and as the frame C is moved, by means hereinafter described, the thimble K moves farther up on the end of the cutter-bar I, having the friction-roller *b*, and the material L moves from under the cutter so that the axle will be formed to fit the thimble.

The frame C is moved by the following means: Upon a plate, *m*, attached to a cross-bar of the frame C, are pivoted the bars *n*, the lower ends of which are provided with coincident threaded apertures, so shaped as to form, when brought together, a nut around the screw-shaft H, thus binding upon the shaft and causing the frame to move in the direction in which the shaft is operating when it revolves. The lower ends of the bars *n* are separated by means of a spring, *p*, and are closed by means of a wedge, *i*, inserted between the upper ends, said wedge being attached to a lever, *s*, hinged or pivoted on one end to the frame, and so arranged that when depressed the wedge is forced between the upper ends of the bars *n*, expanding them and thus closing upon the shaft K, the parts forming the nut aforesaid, so that by this means the movement of the frame C can be conveniently controlled.

What I claim as my invention, and desire to secure by Letters Patent, is—

1. The combination of the main frame A, movable frame C, hollow drum D, gears G G′, screw-shaft H, bent bar I, roller *b*, spring *a*, cutter J, bars *n*, and at each end of the frame C a lever, *h*, and catch *k*, all constructed and arranged to operate substantially as and for the purpose herein set forth.

2. The combination of the cutter-bar I, provided with the cutting-tool J and friction-roller *b* and drum D, substantially as specified.

3. The bars *n*, constructed as described, provided with the spring *p*, and operated by the wedge *i* and lever *s*, in combination substantially as specified.

REUBEN ZEIDER.

Witnesses:
J. A. CARBAUGH,
PETER B. BRANT.